Oct. 21, 1930.  G. W. CRABTREE  1,778,887
REBOUND CHECK
Filed Sept. 3, 1926  4 Sheets-Sheet 3
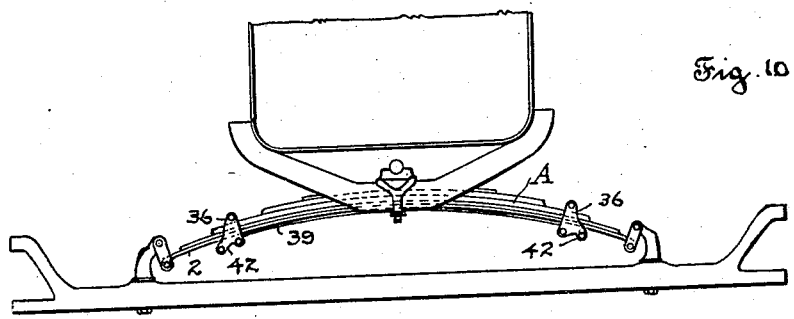
Fig. 10
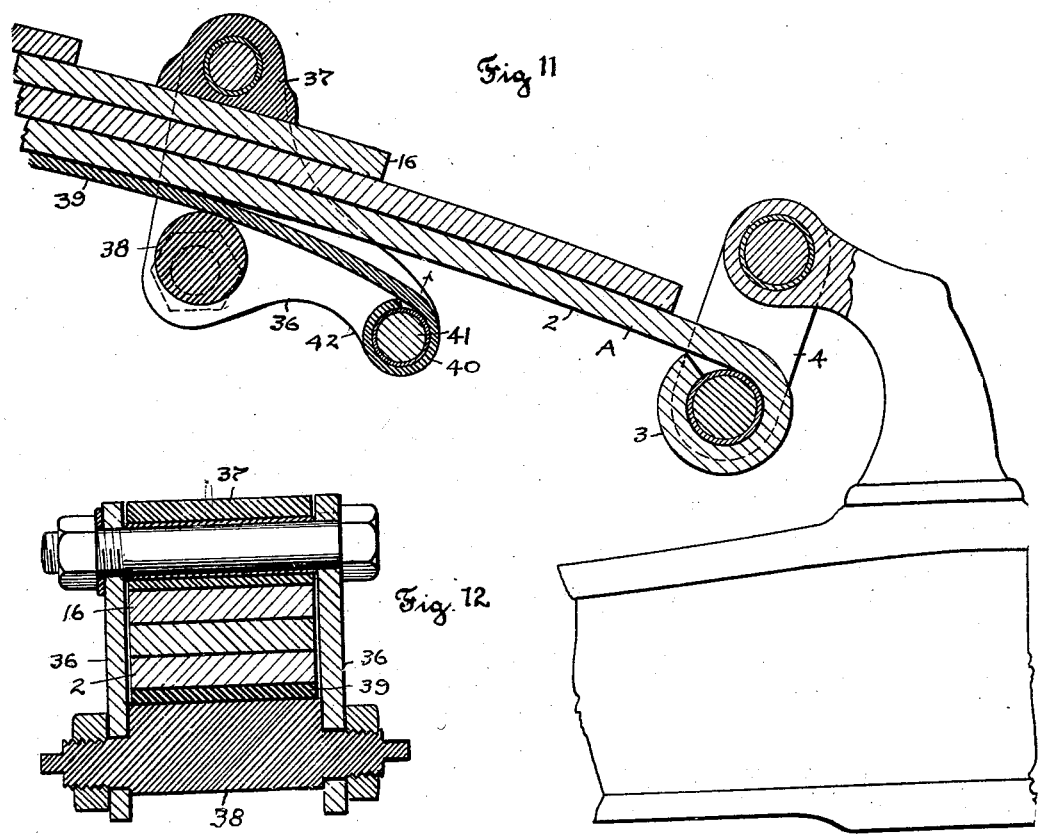
Fig. 11
Fig. 12
Inventor
G.W. CRABTREE
By Fisher, Moser & Moore
Attorneys Oct. 21, 1930.  G. W. CRABTREE  1,778,887
REBOUND CHECK
Filed Sept. 3, 1926  4 Sheets-Sheet 4

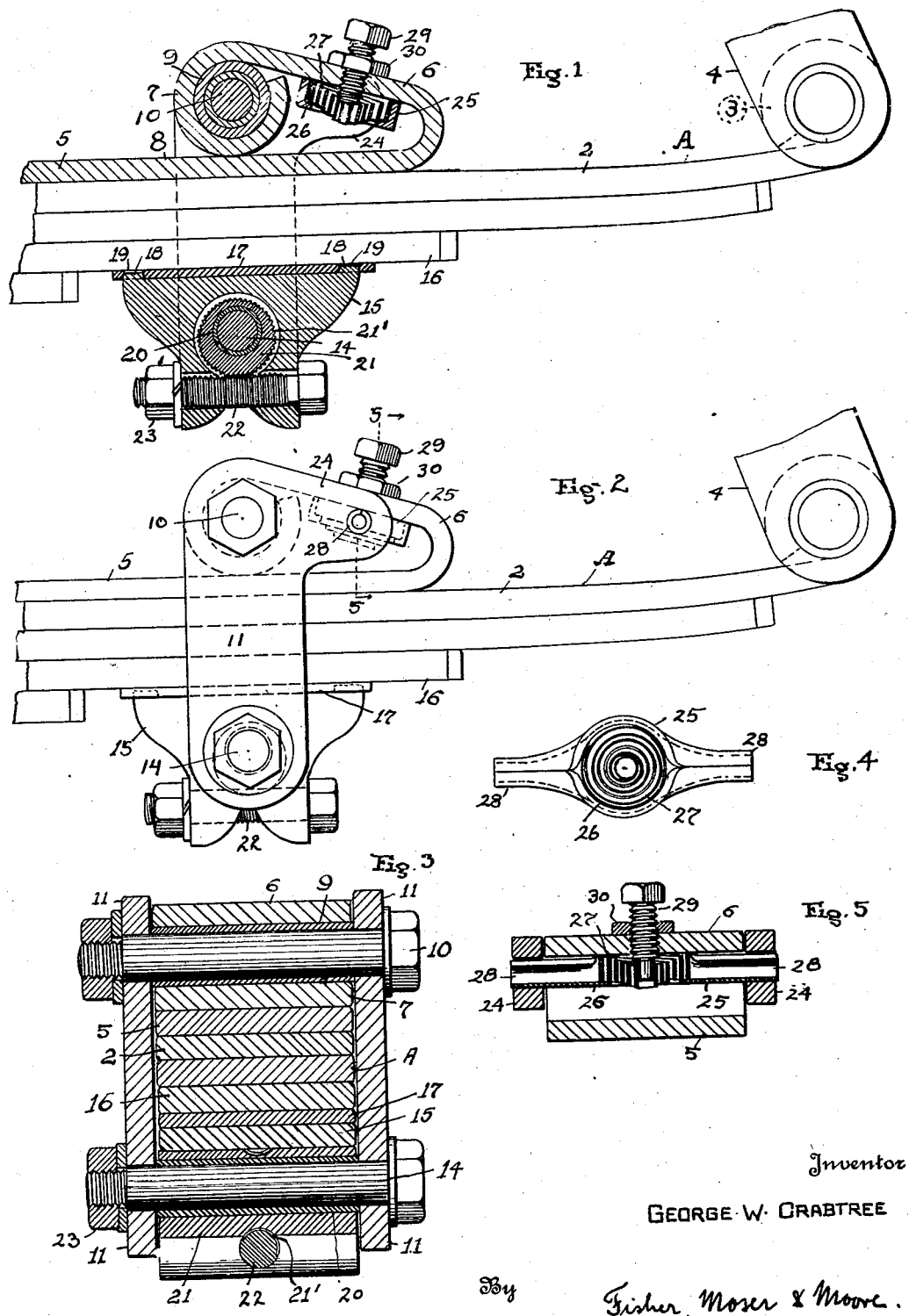

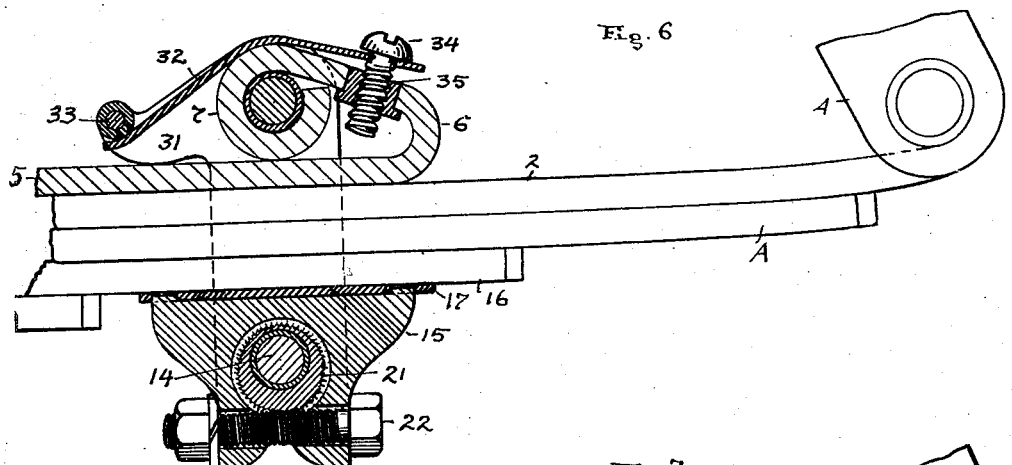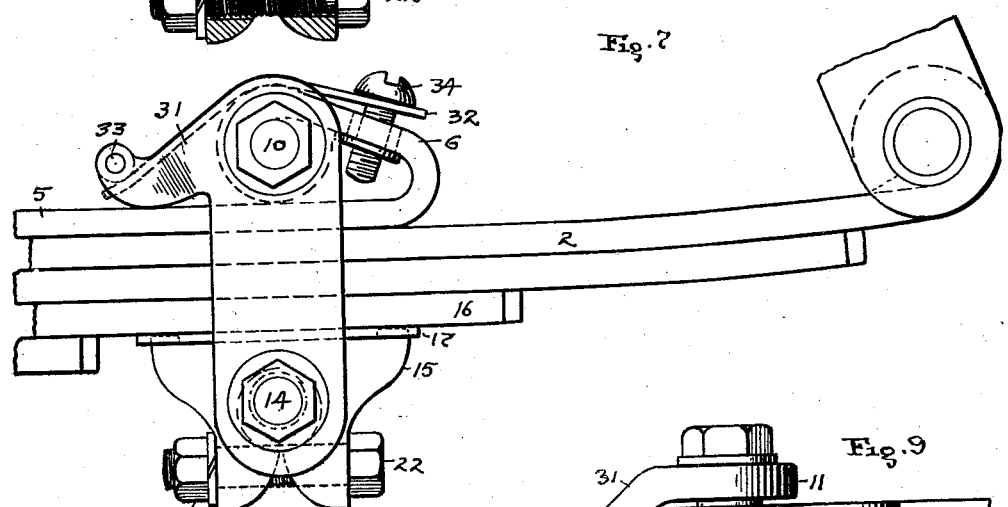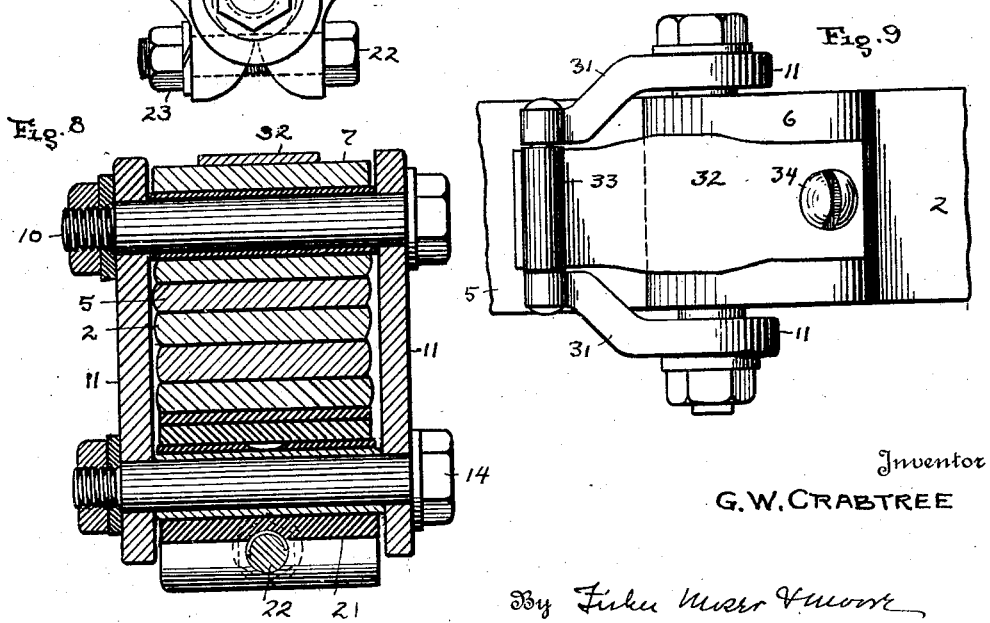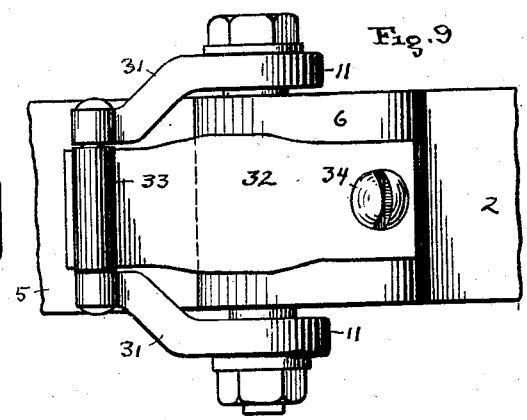

Inventor
G. W. CRABTREE

Patented Oct. 21, 1930

1,778,887

UNITED STATES PATENT OFFICE

GEORGE W. CRABTREE, OF CLEVELAND HEIGHTS, OHIO

REBOUND CHECK

Application filed September 3, 1926. Serial No. 133,311.

My invention relates to laminated leaf springs for vehicles, and in general my object is to provide a supplemental attachment for a leaf spring adapted to brake and retard the rebound or reflex action of the spring while permitting perfect freedom of movement of the spring in the opposite direction, all as hereinafter shown and described and more particularly pointed out in the claims.

Figure 13:
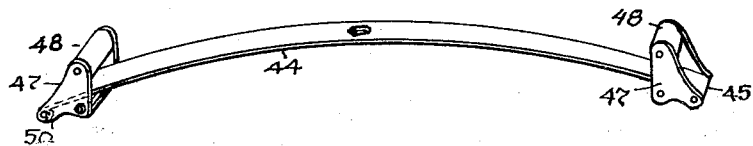
Figure 14:
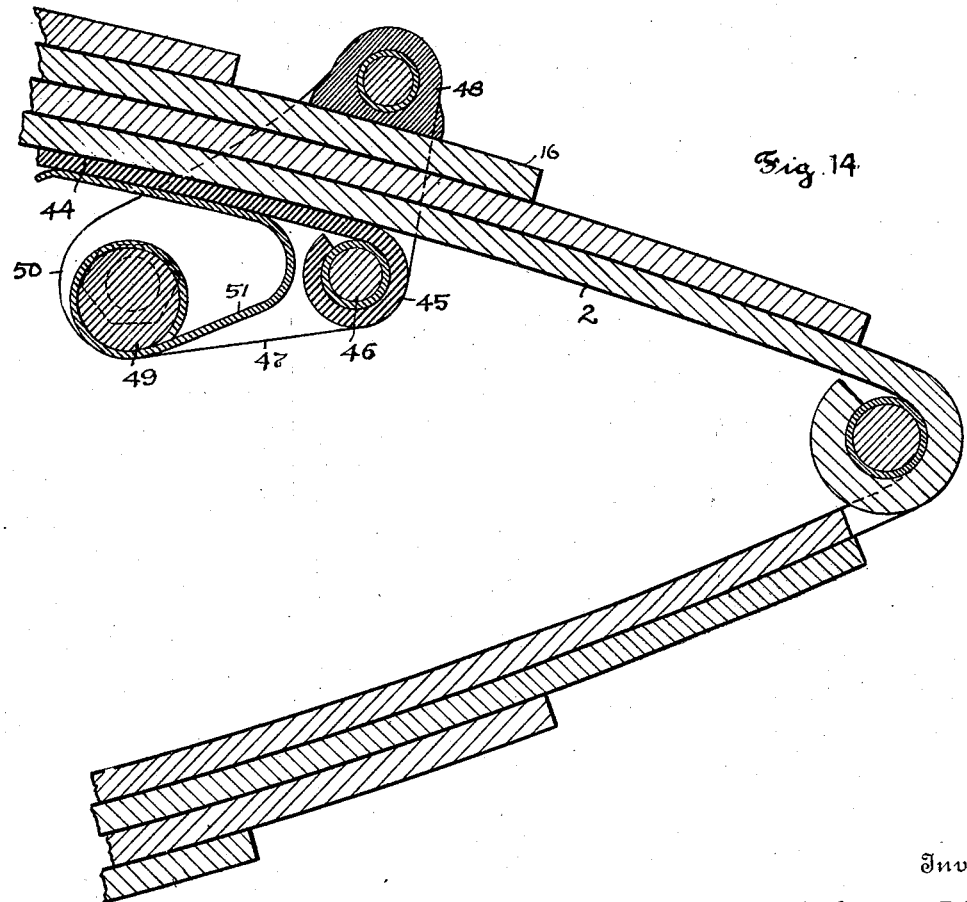

In the accompanying drawing, Fig. 1 is a side elevation of one end of a leaf spring and a sectional view of my improved braking and retarding device attached thereto. Fig. 2 is a side view of all the parts shown in Fig. 1. Fig. 3 is a vertical section transversely of the spring and attachment. Fig. 4 is a top view of the coiled spring and its rocking holder. Fig. 5 is a sectional view on line 5—5 of Fig. 2. Figs. 6, 7, and 8, Sheet 2, are views corresponding to Figs. 1, 2 and 3, respectively, showing a modification of the invention, and Fig. 9 is a top view thereof. Fig. 10, Sheet 3, is a front view of a vehicle spring equipped with a modified form of the invention, and Figs. 11 and 12 are sectional views, on a larger scale, of the working parts of the device. Fig. 13, Sheet 4, is a perspective view of another modified form of leaf spring clamping device, and Fig. 14 is an enlarged sectional view of a part of a full elliptic spring and said device affixed thereto.

The invention comprises a vehicle spring A having any desired number of laminations or leaves and constructed in general according to known practices for connection to a vehicle axle and body. For example, the longer leaf 2 of the spring may be formed with an eye 3 to permit it to be connected to the frame or body of the vehicle by a link or shackle 4, and the spring may be a semi-elliptic or quarter-elliptic spring in that case. However, the invention is also applicable to a full elliptic spring, and the mode of connection for the spring with the axle and body is secondary consideration, because in every laminated leaf spring assembly designed to support a vehicle body the respective leaves of the spring or springs have a differential play or movement longitudinally in respect to each other. This relative movement between the spring leaves is utilized in the present instance to obtain a friction clamping effect between the spring leaves in the rebound or reflex action of the spring. Thus, I provide a supplemental spring leaf 5, preferably of lesser thickness than the leaves of the main spring, which supplemental leaf 5 is laid upon or against longer leaf 2 and has a straight reversed portion 6 terminating in a round eye 7 adapted to bear against the top or outer surface 8 of said supplemental leaf.

A bushing 9 is confined within eye 7, and a bolt 10 extends through this bushing to provide a pivotal support and fastening for a pair of drag links 11—11 of crank shape at opposite sides or edges of the spring leaves. These drag links extend downwardly beyond one of the secondary and shorter spring layers or leaves to permit a second bolt 14 to connect said links together for joint movement and to permit a braking or clamping shoe 15 to be rotatably or pivotally mounted thereon opposite the bottom or outer face of one of the shorter spring leaves, for example, leaf 16. Shoe 15 may engage leaf 16 directly, but I prefer instead to interpose a removable friction plate 17 between shoe 15 and leaf 16, and to provide one or more short projections 18 on the shoe adapted to occupy corresponding openings or shallow recesses 19 in friction plate 17 to prevent longitudinal displacement of the plate. A spacing bushing 20 for links 11 is sleeved on bolt 14, and a cylindrical member 21 is rotatably sleeved in an eccentric position upon this bushing 20 to permit brake shoe 15 to be adjustably fixed in respect to spring leaf 16 and in that way permitting increased or decreased friction and clamping pressure to be obtained against the spring leaf and permitting adjustments for wear. Eccentric member 21 contains an annular groove with worm teeth 21' whereby said member may be rotated and also locked by a screw-threaded bolt 22 which extends through openings in the lower part of shoe 15. This shoe is also split or divided to permit eccentric member 21 to be clamped between the divided sides when a nut 23 on bolt 22 is tightened.

The shorter arms 24 of the drag links or crank members 11 extend toward the outer or reverted part of supplementary spring leaf 5, and a cross piece or saddle 25 having a seat 26 for a helical spring 27 is pivotally connected with or swiveled upon short arm 24 between the folds or within the reverted part of spring leaf 5. As shown the cross piece 25 is formed of sheet metal and comprises round trunnions 28—28 pivotally supported within arms 24, and spring seat 26 is open at its center to permit the coils of helical spring 27 to be pressed downwardly when engaged at the center coil by a set screw 29 which extends through a screw-threaded opening in the flat reverted part 6 of leaf spring 5. After adjustments and a desired spring tension has been obtained by means of set screw 29 a lock nut 30 is tightened to assure a permanent setting of set screw 29. Helical spring 27 tends constantly to tilt drag links 11 on their common pivot bolt 10, thereby holding friction plate 17 of brake shoe 15 against the bottom face of leaf spring 16, and eccentric member 21 may be adjusted to hold the drag links 11 at substantially right angles to the plane surfaces of the leaf springs.

In this working position of the parts saddle 25 carried by arms 24 of drag links 11 serves to limit and stop the tilting of said links in one direction, that is, toward the stepped ends of the spring leaves, thereby preventing shoe 15 from clamping the spring leaves together when the spring as a whole is flexed downwardly. In this downward flexure of the spring the shorter bottom leaf 16 creeps and moves outwardly toward the shackle connection, and shoe 15 slides freely. However, helical spring 27 constantly bears down upon the saddle and the crank arms 24 of drag links 11 thereby acting to tilt the links in the opposite direction so that shoe 15 will always be in a friction-engaging position to check a rebound or reflex action of the vehicle spring.

In operation when spring A is deflected downwardly under load, the shorter leaves beneath main leaf 2 slide outwardly, while supplemental leaf 5 which is above main leaf 2 slides in the opposite direction thus carrying drag links 11 and shoe 15 with it. But in this movement shoe 15 is prevented from clamping the leaves together by the stop relations established for the drag links at saddle 25. Shoe 15 has a tendency to travel outwardly with spring leaf 16 but helical spring 27 counteracts this tendency. The vehicle spring is therefore free to flex downwardly without hindrance or check. However, the recoil movement of the spring is immediately retarded or checked by a clamping action of shoe 15 which functions then as follows: As the reflex action of the main spring takes place the short bottom leaves thereof slide in a reverse direction, that is, away from instead of toward the shackle connection, while the reverted end of supplemental spring 5 moves toward said connection, thus dragging links 11 and the shoe with the end of said supplemental spring and thereby tilting the links and effecting a clutching action of the shoe against leaf 16 and clamping the several leaves, including supplemental leaf 5, between the shoe and eye 7. Helical spring 27 in pressing down upon the crank arms of the links fosters and expedites the clutching action of shoe 15, and sudden or violent rebound of the main spring is prevented, not only by the friction of shoe 15 but also by the binding action on the sliding leaves of the vehicle spring. Adjusting screw 29 permits changes in tension of helical spring 27 for different kinds of vehicle springs and cars; it permits control of rebound checking results; and it also prevents looseness or rattling. A flat helical spring seated within a shallow cup-shaped cross piece or saddle also permits a compact assembly of parts and confinement thereof between the reverted folds of spring 5 with ample room for free movement of such parts when so confined and protected. However, the mode of connection of the drag links with the supplemental spring is susceptible to modification without departing materially from the actual invention involved, and therefore I do not wish to limit myself to obvious mechanical changes or modifications in that connection or other features as shown herein. For example, the clamping shoe in the present case is shown as seated against the second short leaf of the laminated vehicle spring; but obviously this shoe may be engaged with one of the other short leaves or one or more leaves thereof.

Figs. 6 to 9 illustrate a modified form of the invention, comprising drag links 11 having crank arms 31 extending away from the spring shackle 4 and engaged by a flat spring 32 which rests at its middle upon eye 7 and extends under a connecting piece 33 between crank arms 31. The opposite end of spring 32 is held under adjustable spring tension by a screw 34 which passes through a flanged collar or bushing 35 within the reverted portion 6 of supplemental leaf 5.

Figs. 10 to 12 illustrate another modification, comprising crank-shaped drag links 36 carrying a brake shoe 37 and an eccentric 38, the supplemental spring leaf 39 in this case having a reverted portion or eye 40 which is pivotally connected to a bolt 41 between crank arms 42. The end part of leaf 39 is bowed or bent apart from main leaf 2 of the vehicle spring so that it tends to tilt the drag links constantly in one direction and hold brake shoe 37 against a secondary leaf.

Figs. 13 and 14 show still another form of the invention, comprising a supplemental leaf 44 having an eye 45 at each end adapted to connect with a cross bolt 46 for a pair of drag links 47 having a brake shoe 48 engaged with a secondary leaf of the vehicle spring. An eccentric 49 is mounted between the crank arms 50, and a bowed spring 51 is curled at one end around this eccentric and has its other or bowed end in pressing engagement with the body of leaf 44 to tilt the links in one direction and hold shoe 48 in clamping engagement with the vehicle spring opposite eye 45.

What I claim, is:

1. A rebound check for laminated vehicle springs, comprising a supplemental leaf seated against the main leaf of said laminated spring, drag links connected to said supplemental leaf, a clamping shoe pivotally connected to said links and bearing against one of the secondary leaves of the laminated spring, said shoe being adapted to clamp and bind the spring leaves under recoil movements of the vehicle spring, and compound lever and spring means co-acting with said drag links and adapted to limit the movement of said shoe in one direction to permit free sliding movement of the shoe upon flexure of the vehicle spring under load.

2. A rebound check for laminated vehicle springs, comprising a supplemental leaf member, drag links pivotally connected to said leaf member, a clamping shoe connected to said links, means for adjusting said shoe to obtain different clamping effects therewith, and compound lever and spring means associated with and adapted to tilt said links.

3. A rebound check for laminated vehicle springs, comprising a supplemental leaf, links pivotally connected to said leaf, a clamping shoe connected to said links, and an eccentric device for adjusting said shoe.

4. A rebound check for laminated vehicle springs, comprising a supplemental leaf, links pivotally connected to said leaf, a clamping shoe carried by said links, adjustable means for fixing the working position of the shoe, and adjustable springs for tilting said links to keep said shoe in contact with one of the leaves of the laminated vehicle spring.

5. A rebound check for laminated vehicle springs, comprising drag links, a rotatable eccentric supported upon said links, a split clamping shoe sleeved upon said eccentric, and means adapted to clamp said split shoe upon said eccentric.

6. A rebound check for laminated vehicle springs, comprising a pair of drag links, an eccentric rotatably supported between said links having worm teeth, a clamping shoe sleeved upon said eccentric, and a rotatable screw upon said shoe in screw engagement with said worm teeth.

7. A rebound check for laminated vehicle springs, comprising a pair of drag links, a bolt connecting said links, an eccentric rotatably mounted upon said bolt, said eccentric having peripheral teeth, a divided clamping shoe sleeved rotatably upon said eccentric, a screw-threaded bolt extending through said divided shoe in screw-engagement with said peripheral teeth, and a nut for said bolt adapted to clamp the split shoe upon the eccentric.

8. A rebound check for laminated vehicle springs, comprising a supplemental member having a reverted end portion, a clamping shoe and drag-links therefor pivotally connected to said member, a cross piece connected to said drag links, and a coiled spring seated upon said cross piece opposite said reverted portion.

9. A rebound check for laminated vehicle springs, comprising a supplemental leaf having a reverted end portion, drag links pivotally connected to said reverted end portion, a clamping shoe supported by said links, a spring seat supported upon said links opposite said reverted end portion, a coiled spring resting upon said seat, and an adjusting screw mounted upon said reverted portion and engaging said coiled spring.

10. A rebound check for laminated vehicle springs, comprising a supplemental leaf having a reverted end portion terminating in an eye, a clamping shoe, drag links for said shoe pivotally connected with said eye, said links having crank arms, a cross connection between said crank arms adapted to engage said reverted portion, and limit the tilting movement of said drag links in one direction, a helical spring seated upon said cross connection, and an adjusting screw mounted upon said reverted end portion and engaging said spring.

11. A rebound check for laminated vehicle springs, comprising a supplemental member having a reverted end portion, a clamping shoe and drag-links therefor pivotally connected to said member, a cross piece connected to said drag links, and a spring bearing against said cross piece opposite said reverted portion.

In testimony whereof I affix my signature.

GEORGE W. CRABTREE.